(12) United States Patent
Widlroither et al.

(10) Patent No.: US 12,123,150 B2
(45) Date of Patent: Oct. 22, 2024

(54) SPIKE PULLER AND METHOD FOR PULLING A RAILROAD SPIKE OF A TRACK

(71) Applicant: ROBEL Bahnbaumaschinen GmbH, Freilassing (DE)

(72) Inventors: Otto Widlroither, Freilassing (DE); Bernhard Koch, Anger (DE); Thomas Hoelzlwimmer, Burgkirchen an der Alz (DE)

(73) Assignee: ROBEL Bahnbaumaschinen GmbH, Freilassing (DE)

( * ) Notice: Subject to any disclaimer, the term of this patent is extended or adjusted under 35 U.S.C. 154(b) by 0 days.

(21) Appl. No.: 18/446,556

(22) Filed: Aug. 9, 2023

(65) Prior Publication Data

US 2023/0383475 A1 Nov. 30, 2023

Related U.S. Application Data

(63) Continuation of application No. 17/356,778, filed on Jun. 24, 2021, now Pat. No. 11,851,824.

(30) Foreign Application Priority Data

May 10, 2021 (DE) ...................... 10 2021 204 712.2

(51) Int. Cl.
*E01B 29/32* (2006.01)
*B23P 6/00* (2006.01)
*B25C 11/02* (2006.01)

(52) U.S. Cl.
CPC ................ *E01B 29/32* (2013.01); *B23P 6/00* (2013.01); *B25C 11/02* (2013.01); *B66F 2700/00* (2013.01); *Y10T 29/49819* (2015.01); *Y10T 29/49822* (2015.01); *Y10T 29/53848* (2015.01); *Y10T 29/53943* (2015.01)

(58) Field of Classification Search
CPC ...... E01B 29/32; B25C 11/02; B66F 2700/00; B23P 6/00; Y10T 29/49819; Y10T 29/49822; Y10T 29/53848; Y10T 29/53943
See application file for complete search history.

(56) References Cited

U.S. PATENT DOCUMENTS

| 714,989 A | 12/1902 | Worthington ........... E21B 31/20 29/213.1 |
| 3,978,576 A | 9/1976 | Mustoe, Jr. ............. B25C 11/02 254/18 |

(Continued)

FOREIGN PATENT DOCUMENTS

EP 3677725 A1 7/2020

*Primary Examiner* — Jermie E Cozart
(74) *Attorney, Agent, or Firm* — Laurence A. Greenberg; Werner H. Stemer; Ralph E. Locher

(57) ABSTRACT

A spike puller for pulling a railroad spike of a track includes a housing, a linear displacement unit mounted at the housing, and a claw unit for gripping the railroad spike. The claw unit is displaceable in a linear manner relative to the housing in a displacement direction by using the linear displacement unit. The linear displacement unit includes a hollow tube which is guided in the housing. An electric drive unit electrically operates the linear displacement unit. A method for pulling a railroad spike of a track is also provided.

21 Claims, 5 Drawing Sheets

(56) References Cited

U.S. PATENT DOCUMENTS

| | | | |
|---|---|---|---|
| 5,924,679 A | 7/1999 | Wilson | E01B 29/26 254/24 |
| 6,113,073 A | 9/2000 | Lefavour | E01B 29/26 254/24 |
| 2018/0223483 A1 | 8/2018 | Hamilton | E01B 29/28 |
| 2020/0032461 A1 | 1/2020 | Widlroither | B25C 11/00 |
| 2020/0173117 A1* | 6/2020 | Benjamin | B25C 11/00 |

* cited by examiner

SPIKE PULLER AND METHOD FOR PULLING A RAILROAD SPIKE OF A TRACK

CROSS REFERENCE TO RELATED APPLICATION

This application is a Continuation of co-pending U.S. application Ser. No. 17/356,778, filed Jun. 24, 2021. This application also claims the priority, under U.S.C. § 119, of German Patent Application DE 10 2021 204 712.2, filed May 10, 2021; the prior applications are herewith incorporated by reference in their entirety.

BACKGROUND OF THE INVENTION

Field of the Invention

The present invention relates to a spike puller and a method for pulling a railroad spike of a track.

A portable spike puller for pulling a railroad spike is known from European Patent Application EP 3 677 725 A1. The spike puller disclosed in FIG. 12 thereof includes a housing with a threaded spindle and a mounting flange as well as a claw unit. The claw unit is connected to the mounting flange through a plate and four standoffs. The plate and mounting flange are used to guide the claw unit within the housing when pulling a railroad spike.

BRIEF SUMMARY OF THE INVENTION

It is accordingly an object of the invention to provide a spike puller and a method for pulling a railroad spike of a track, which overcome the hereinafore-mentioned disadvantages of the heretofore-known devices and methods of this general type and in which the spike puller has a simple and at the same time stable structure and enables a reliable and efficient pulling of a railroad spike.

With the foregoing and other objects in view there is provided, in accordance with the invention, a spike puller for pulling a railroad spike of a track, comprising a housing, a linear displacement unit mounted on the housing, a claw unit which is used for engaging a railroad spike and which is displaceable by using the linear displacement unit in a linear manner relative to the housing in a displacement direction, the linear displacement unit includes a hollow tube, and the hollow tube is guided in the housing, and an electric drive unit is provided for electrically operating the linear displacement unit. Due to the fact that the linear displacement unit has a hollow tube which is guided in the housing, a particularly simple and at the same time stable construction of the spike puller is achieved and thus a reliable and efficient pulling of a railroad spike is made possible. Advantageously, the hollow tube guides the linear displacement unit directly in the housing. In other words, the hollow tube serves to guide the linear displacement unit in the housing.

In particular, the hollow tube is configured in such a way that the hollow tube does not perform a displacement movement in a radial manner with respect to an axis of rotation of the linear displacement unit and/or about the axis of rotation. Preferably, a maximum transverse dimension of the hollow tube is greater than a minimum transverse dimension of the housing in order to prevent the hollow tube from rotating within the housing about the axis of rotation of the linear displacement unit. The maximum transverse dimension of the hollow tube corresponds to a distance between two points of the hollow tube cross-section that have the greatest possible distance from one another. The minimum transverse dimension of the housing corresponds to a distance between two points of the housing cross-section that have the smallest possible distance from one another.

In particular, a housing cross-section of the housing is configured in a polygonal, advantageously square, hexagonal or octagonal manner. In a particularly advantageous embodiment, the housing cross-section is configured in a square manner. In particular, a hollow tube cross-section of the hollow tube is configured in a polygonal, advantageously quadrangular, hexagonal or octagonal manner. In a particularly advantageous embodiment, the hollow tube cross-section and the housing cross-section are configured equally, in particular both in a square manner.

The displacement of the linear displacement unit causes the claw unit to be displaced. The claw unit is linearly displaceable relative to the housing. The claw unit serves for engaging the railroad spike, wherein engaging a railroad spike especially means gripping the railroad spike. Advantageously, the claw unit is disposed directly at the hollow tube by using a force-locking and/or form-locking connection. This enables a particularly simple construction of the spike puller.

In a first direction of rotation, the linear displacement unit can be displaced in the displacement direction between an engagement position and an end position. In a second direction of rotation of the linear displacement unit, the claw unit can be displaced in a counter-displacement direction between the end position and the engagement position. The engagement position is the position in which the linear displacement unit is maximally displaced along the counter-displacement direction and the claw unit engages the railroad spike. The end position is the position in which the linear displacement unit is maximally displaced along the displacement direction and the claw unit has pulled the railroad spike out of the track.

The maximum distance between the engagement position and the end position corresponds to a maximum stroke height $H_{max}$ of the spike puller. For the maximum stroke, a height $H_{max}$, in particular, $H_{max} \geq 190$ mm, advantageously $H_{max} \geq 200$ mm, is provided. In a particularly advantageous embodiment, $H_{max} \geq 230$ mm applies. Such a stroke height makes it possible that longer railroad spikes can also be pulled out of the track with the spike puller. At the same time, a spike puller with such a maximum stroke height allows for particularly easy handling of the spike puller, since it thus has an overall length that is ergonomically advantageous for the user. Preferably $H_{max} \geq 400$ mm, in particular $H_{max} \geq 300$ mm.

In particular, the hollow tube has a maximum length $LH_{max}$, wherein the following applies to this maximum length $LH_{max}$: $LH_{max}$ 12 inches or $LH_{max} \geq 30.48$ cm. In a particularly advantageous embodiment, the following applies to the maximum length $LH_{max}$: $LH_{max} = 12.1$ inches or $LH_{max} = 30.734$ cm. This ensures a particularly simple and at the same time stable construction of the spike puller and reliable guidance of the linear displacement unit.

Advantageously, the hollow tube has a plurality of hollow tube sub-elements, in particular two, in particular three, advantageously four hollow tube sub-elements. In particular, the individual hollow tube sub-elements are disposed one after the other in the displacement direction. Advantageously, the plurality of hollow tube sub-elements are linked to one another through linking elements. According to a particularly advantageous embodiment, the linking elements are constructed as a plug-in connection, whereby the hollow tube sub-elements can be reversibly plugged into one another. This has the advantage that a length LH of the hollow tube can be modularly adapted, in particular extended or shortened.

In particular, the spike puller is constructed to be portable. Advantageously, a carrying handle for carrying the spike puller is disposed at the housing. By using the carrying handle, the spike puller can be carried in a particularly simple manner to the actual place of work where the railroad spike is to be pulled out of the track. In particular, the carrying handle is formed in one piece with the housing. Alternatively, the carrying handle is advantageously disposed at the housing by using clamps. In particular, the clamps can each be clamped by using a clamping element on one side of the housing opposing the carrying handle. Due to the fact that the clamping elements can be detached, the carrying handle can be removed from the housing. In particular, it is no longer possible to displace the carrying handle along the displacement direction after the clamps have been clamped to the housing.

Advantageously, the spike puller has a protective cap. The protective cap serves to protect a lower end of the housing. The lower end of the housing is the end of the housing facing the track when the railroad spike is pulled. The protective cap protects the lower end of the housing from damage. The protective cap may be connected to the housing. Alternatively, the protective cap may be constructed as an independent component which is disposed at the lower end of the housing, in particular in a reversible manner. The connection can be constructed in particular as a force-locking and/or form-locking connection.

The spike puller or the linear displacement unit can be operated electrically by using an electric drive unit, in particular by using a cordless screwdriver.

A spike puller configured in such a way that the linear displacement unit includes exactly one hollow tube enables a particularly simple and stable construction. With exactly one hollow tube, the spike puller is particularly light, whereby handling is extremely simplified. In addition, the use of exactly one hollow tube enables simple replacement of the component in the event of damage, which in particular also simplifies the maintenance of the spike puller.

A spike puller including a guiding portion, wherein the guiding portion has a length LFA and the hollow tube has a length $L_H$, wherein for a length ratio: $0.2 \leq L_{FA}/L_H \leq 1.0$, in particular $0.3 \leq L_{FA}/L_H \leq 0.9$, in particular $0.4 \leq L_{FA}/L_H \leq 0.8$, and/or wherein the guiding portion has an area AFA and the hollow tube has an area $A_H$, wherein for an area ratio: $0.2 \leq A_{FA}/A_H \leq 1.0$, in particular $0.3 \leq AFA/AH \leq 0.9$, in particular $0.4 \leq A_{FA}/A_H \leq 0.8$, enables reliable and efficient pulling of a railroad spike. The guiding portion is the portion on the hollow tube over which the hollow tube is guided in the housing. Advantageously, the guiding portion is defined by the maximum distance between two guided points along the displacement direction. In particular, the guiding portion is in contact with an inner side of the housing over its length $L_{FA}$, at least in some regions. In particular, the guiding portion is at least partially in contact with the inside of the housing over its area $A_{FA}$.

In addition to the length $L_{FA}$, the area $A_{FA}$ is defined by a width $B_{FA}$. The advantage of a guiding portion with a large length $L_{FA}$ or a large area $A_{FA}$ is that it enables a railroad spike to be pulled particularly reliably. The advantage of a guiding portion with a short length $L_{FA}$ or a small area $A_{FA}$ is that it enables a particularly low-friction and thus efficient pulling of a railroad spike.

A spike puller including at least one guiding element between the housing and the hollow tube enables reliable and efficient pulling of a railroad spike. The at least one guiding element serves for guiding the hollow tube in the housing. In particular, the at least one guiding element is disposed in the guiding portion. Advantageously, the at least one guiding element is disposed at an inner side of the housing and/or disposed at an outer side of the hollow tube. Advantageously, a number M of guiding elements is disposed at the housing and/or at the hollow tube, wherein in particular $2 \leq M \leq 32$, in particular $4 \leq M \leq 24$, and in particular $8 \leq M \leq 16$.

According to a particularly advantageous embodiment, the at least one guiding element is attached to the hollow tube and/or to the housing by using a tongue-and-groove connection. For this purpose, the at least one guiding element has, for example, a spring that can be reversibly inserted into a complementary groove at the hollow tube and/or at the housing.

If the housing and/or the hollow tube has a polygonal cross-section with a plurality of side walls, at least one guiding element can be assigned to each side wall. In particular, two, advantageously four guiding elements are assigned to each side wall. The guiding elements can be disposed in the displacement direction and/or radially around the axis of rotation in an offset-manner.

The at least one guiding element is advantageously formed from a low-friction material, in particular from a polymer, advantageously from an abrasion-resistant plastic material.

A spike puller configured in such a way that the respective guiding element has a length $L_{FE}$ and a guiding portion has a length $L_{FA}$, wherein for a length ratio: $0.02 \leq L_{FE}/L_{FA} \leq 1.0$, in particular $0.1 \leq L_{FE}/L_{FA} \leq 0.9$, in particular $0.2 \leq L_{FE}/L_{FA} \leq 0.8$, and/or configured in such a way that the respective guiding element has an area $A_{FE}$ and a guiding portion has an area $A_{FA}$, wherein for an area ratio: $0.02 \leq A_{FE}/A_{FA} \leq 1.0$, in particular $0.1 \leq A_{FE}/A_{FA} \leq 0.9$, in particular $0.2 \leq A_{FE}/A_{FA} \leq 0.8$, allows for a particularly efficient pulling of a railroad spike. The advantage of a guiding element with a large length $L_{FE}$ or with a large area $A_{FE}$ is that this allows for a particularly reliable pulling of a railroad spike. The advantage of a guiding element with a short length $L_{FE}$ or with a small area $A_{FE}$ is that this enables a particularly low-friction and thus efficient pulling of a railroad spike.

Advantageously, the respective guiding element forms a guiding surface. The guiding surface is the contact surface of the respective guiding element with the inside of the housing or with the outside of the hollow tube, depending on where the respective guiding element is disposed. The guiding surface serves to guide the hollow tube in the housing. In particular, the hollow tube guides the linear displacement unit in the housing through the respective guiding element, wherein the guiding surface rests on the inside of the housing or on the outside of the hollow tube. The respective guiding surface corresponds in particular to the area $A_{FE}$.

A spike puller configured in such a way that the linear displacement unit includes a mounting flange which is disposed at the hollow tube and configured in such a way that the linear displacement unit includes a threaded spindle, allows for a particularly stable construction of the spike puller. The mounting flange is disposed between the threaded spindle and the hollow tube. In particular, the mounting flange has an internal thread through the use of which it is operatively connected to an external thread of the threaded spindle. A rotation of the threaded spindle in particular causes a linear movement of the mounting flange, whereby it can be displaced along the displacement direction or the counter-displacement direction.

In particular, the mounting flange can be disposed at least partially inside the hollow tube. Advantageously, the mounting flange is disposed completely inside the hollow tube on an inner side of the hollow tube. This has the advantage that the maximum stroke height $H_{max}$ of the spike puller is greater for the same length of the hollow tube LH. The mounting flange and the hollow tube can in particular be formed in one piece. Alternatively, the hollow tube and the mounting flange can be constructed as independent components. This enables simple and inexpensive replacement of the respective component if one of the two components should be damaged.

According to a particularly advantageous embodiment, the threaded spindle has a stop element at one end in the counter-displacement direction. The stop element prevents the mounting flange from moving away from the threaded spindle during the displacement in the direction of counter-displacement. The stop element thus defines the maximum displacement of the linear displacement unit along the counter-displacement direction.

At one end of the threaded spindle in the displacement direction, the threaded spindle has a force transmission element to which the drive unit can be attached and whereby the threaded spindle can be driven in rotation when the drive unit is actuated.

A spike puller configured in such a way that the hollow tube has an undercut which encompasses the mounting flange in the displacement direction has a particularly simple structure. Furthermore, the hollow tube with the undercut enables a particularly reliable pulling of a railroad spike, since the fastening elements which connect the hollow tube to the mounting flange are disposed in the direction of the force flow of the linear displacement. In other words, the fastening elements are not loaded in tension and/or not in shear.

Advantageously, the hollow tube forms the undercut at one end in the displacement direction. The undercut can be formed in one piece with the hollow tube. The undercut forms a flange in a radially inward manner to the axis of rotation for abutting one end of the mounting flange in the displacement direction. In other words, the undercut encompasses the mounting flange in the displacement direction. Due to the undercut, the hollow tube inserted into the housing in particular cannot be detached from the mounting flange in the counter-displacement direction, even if no fastening elements are inserted.

A spike puller configured in such a way that the claw unit is disposed at the hollow tube through a claw fastening element enables a particularly stable construction of the spike puller. The claw fastening element serves to dispose the claw unit on the hollow tube. Advantageously, the claw fastening element is disposed at the hollow tube by using a force-locking connection, in particular the claw fastening element is welded to the hollow tube.

According to an advantageous embodiment, the claw fastening element has a width $B_{GB}$, wherein the width $B_{GB}$ is smaller than the width $B_H$ of the hollow tube. In particular, for a width ratio $B_{GB}/B_H$: $0.1 \leq B_{GB}/B_H \leq 0.9$, in particular $0.2 \leq B_{GB}/B_H \leq 0.7$, in particular $0.3 \leq B_{GB}/B_H \leq 0.5$. With a claw fastening element constructed in such a way, it is achieved that the spike puller continues to be light and is thus easy for a user to handle. According to a particularly advantageous weight-reduced variant of the spike puller, the claw fastening element is configured in a U-shaped or V-shaped manner. In particular, the claw fastening element does not have a plate to connect the claw unit to the hollow tube.

A spike puller configured in such a way that the claw unit has two claws for engaging a railroad spike being swivable relative to one another enables a particularly simple and efficient pulling of a railroad spike. The claw unit has in particular a first claw and a second claw, which are rotationally connected to one another through a rotary pin.

Advantageously, each of the two claws has an engaging portion and a swivel portion, respectively. The respective engaging portions are the portions of the claws at which the claws engage the railroad spike. The swivel portions are the portions of the claws at which the claws are disposed at the hollow tube, in particular at the claw fastening element, through a swivel pin. In particular, the hollow tube or the claw fastening element has a receiving bore for receiving the swivel pin. The swivel pin is thus mounted in the receiving bore and links the claws to the claw fastening element.

Advantageously, the respective swivel portions each have a curved swivel groove in which the swivel pin can be guided when the swivel pin is displaced in the displacement direction. Due to the curvature of the swivel grooves, the claws are mounted on the swivel pin so that they can swivel relative to one another, which means that when the swivel pin is displaced in the displacement direction within the curved swivel grooves, the two claws are rotated or swiveled relative to one another about a rotary pin. When the two claws are rotated, the engaging portions of the respective claws engage the railroad spike.

A spike puller including a receiving retainer for receiving a drive unit enables a particularly simple and at the same time stable structure. The receiving retainer is advantageously disposed, in particular through fastening elements, at an upper end of the housing in the displacement direction. According to an advantageous embodiment, the receiving retainer has a cylindrical cross-section. Alternatively, the receiving retainer can be configured in a polygonal, advantageously square, hexagonal or octagonal manner.

In particular, the receiving retainer forms a receiving space for receiving the electric drive unit. Within the receiving space, the drive unit can be operatively connected to the linear displacement unit, in particular to the threaded spindle, for example by using a force transmission element. The linear displacement unit or the end of the threaded spindle with the force transmission element in this case extends into the receiving space of the receiving retainer.

Advantageously, the receiving retainer has a fixing flange at one end in the displacement direction. Through the use of the fixing flange, the drive unit can be at least partially fixed in the receiving space. Advantageously, the drive unit can additionally be reversibly fixed to the fixing element or to the receiving retainer by using a fixing element, in particular by using a belt. Advantageously, the fixing flange can be formed in one piece with the receiving retainer. Alternatively, the fixing flange can be constructed as a separate component, in which case it is detachably disposed at the receiving retainer. This has the advantage that the fixing flange can be replaced and the receiving retainer can be individually adapted to the respective drive unit used. The drive unit is, for example, a cordless screwdriver.

A spike puller configured in such a way that the receiving retainer has a handhold for holding the spike puller, has a simple structure and enables a particularly efficient pulling of a railroad spike. Advantageously, the handhold forms a holding device with a grip region of the drive unit. The holding device serves to hold the spike puller when pulling the railroad spike.

According to a particularly advantageous embodiment, the axes of the grip region and the handhold are aligned. In other words, each of the respective axes lie in one plane vertically and horizontally. This gives the holding device a T-shaped construction. However, it is also conceivable that the axes of the handhold and the grip region are angled in the horizontal and/or vertical direction for ergonomic reasons.

A spike puller configured in such a way that the housing has an upper housing portion and a lower housing portion, wherein at least one bearing to bear the threaded spindle is disposed at the upper housing portion, and wherein the hollow tube is guided in the lower housing portion, has a particularly simple structure. In particular, the bearing is part of the linear displacement unit. Advantageously, the upper housing portion includes a bearing housing in which the at least one bearing is disposed. The threaded spindle, to this end, extends through the at least one bearing and thus through the bearing housing into the receiving space of the receiving retainer. The guided hollow tube serves as a further bearing of the linear displacement unit.

The lower housing portion is in particular the portion in which the hollow tube can be displaced in a guided manner. The lower housing portion is in particular the portion in which the guiding portion is formed. The upper housing portion is in particular the portion in which no linear displacement takes place. In particular, the upper housing portion forms the stop for the mounting flange or the hollow tube to abut. The stop, to this end, defines the end position of the linear displacement unit.

In accordance with another feature of the invention, the linear displacement unit includes a mounting flange and a threaded spindle; and the mounting flange is disposed between the threaded spindle and the hollow tube.

In accordance with a further feature of the invention, the threaded spindle is configured to be driven in rotation upon actuating the electric drive unit.

In accordance with an added feature of the invention, the threaded spindle has an external thread, and the mounting flange has an internal thread operatively connected to the external thread.

In accordance with an additional feature of the invention, a rotation of the threaded spindle causes a linear movement of the mounting flange.

In accordance with yet another feature of the invention, the threaded spindle has a force transmission element configured for attachment of the electric drive unit.

The invention is further based on the object of creating a method which enables a simple, reliable and at the same time efficient pulling of a railroad spike.

With the objects of the invention in view, there is concomitantly provided a method for pulling a railroad spike of a track, comprising the steps of providing a spike puller according to the invention, positioning the spike puller above the railroad spike so that the claw unit engages around the railroad spike, driving the linear displacement unit by using the electric drive unit, wherein the hollow tube is linearly displaced and guided within the housing and the railroad spike is pulled out of the track. In particular, the method according to the invention can also be further constructed with at least one feature described in connection with the spike puller according to the invention. The advantages of the method correspond to the advantages of the spike puller already described. The advantages already described result in the method for pulling a railroad spike from a track being efficient and reliable.

Other features which are considered as characteristic for the invention are set forth in the appended claims.

Although the invention is illustrated and described herein as embodied in a spike puller and a method for pulling a railroad spike of a track, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
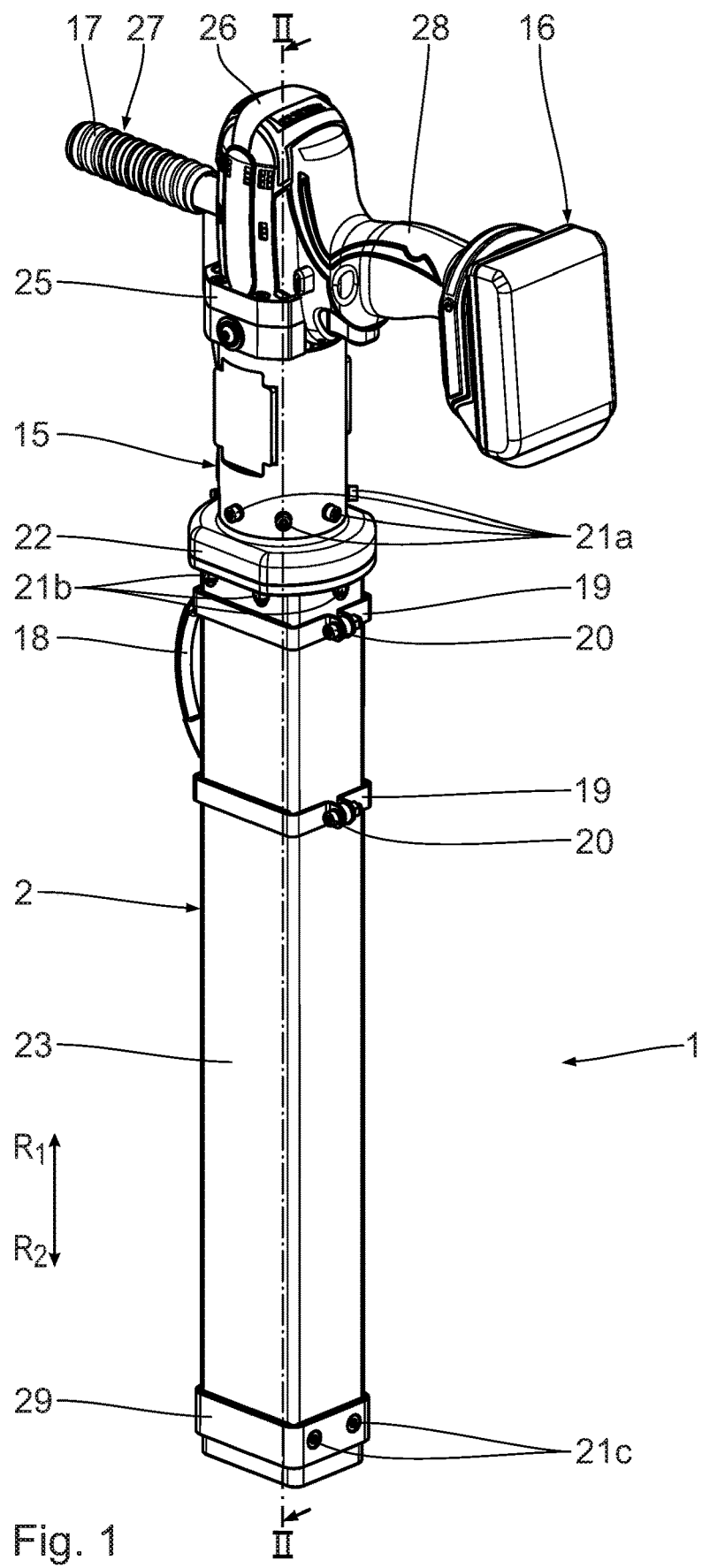
FIG. 1 is a diagrammatic, perspective view of a spike puller according to a first embodiment of the invention.

Referring now in detail to FIGS. 1 to 4 of the drawings as a whole, there is seen a first exemplary embodiment described below. FIG. 1 shows a spike puller 1 for pulling a railroad spike 5 from a track. The railroad spike 5 can be seen in particular in FIG. 2. The track is not shown in the figures for reasons of clarity.

The spike puller 1 includes a housing 2 and a receiving retainer 15 for receiving a drive unit 16. The drive unit 16 is configured as a cordless screwdriver. The receiving retainer 15 is disposed at an upper housing portion 22 of the housing 2 by using fastening elements 21*a*. The receiving retainer 15 is hollow-cylindrical in shape and forms a receiving space 24 for receiving the cordless screwdriver. On the side of the receiving retainer 15 opposite the upper housing portion 22, the receiving retainer 15 has a fixing flange 25, through the use of which the cordless screwdriver can be at least partially fixed. In the illustrated embodiment, the fixing flange 25 has a fixing element 26 through the use of which the cordless screwdriver can be reversibly fixed within the receiving space 24 and thus to the receiving retainer 15 itself.

In addition, the receiving retainer 15 has a handhold 17. The handhold 17 forms a holding device 27 with a grip region 28 of the cordless screwdriver, through the use of which an operator can grip and hold the spike puller 1 when pulling the railroad spike 5. In the illustrated embodiment, the grip region 28 and the handhold 17 lie on one axis and thus vertically and horizontally in one plane, whereby the holding device 27 is T-shaped.

In addition to the upper housing portion 22, the housing 2 has a lower housing portion 23. The upper housing portion 22 and the lower housing portion 23 are connected to each other through fastening elements 21*b*. In the illustrated embodiment, the lower housing portion 23 has a square cross-section.

A carrying handle 18 for carrying the spike puller 1 is disposed at the lower housing portion 23 of the housing 2. The carrying handle 18 is fastened through two clamps 19 spaced apart from each other. The two clamps 19 are each clamped to the housing 2 in a releasable manner through clamping elements 20 on a side of the housing 2 opposing the carrying handle 18.

A protective cap 29 is disposed at an end of the lower housing portion 23 facing the track, which protects the housing 2 from damage. In the illustrated embodiment, the protective cap 29 is disposed at the lower housing portion 23 by using fastening elements 21c.

Figure 2:
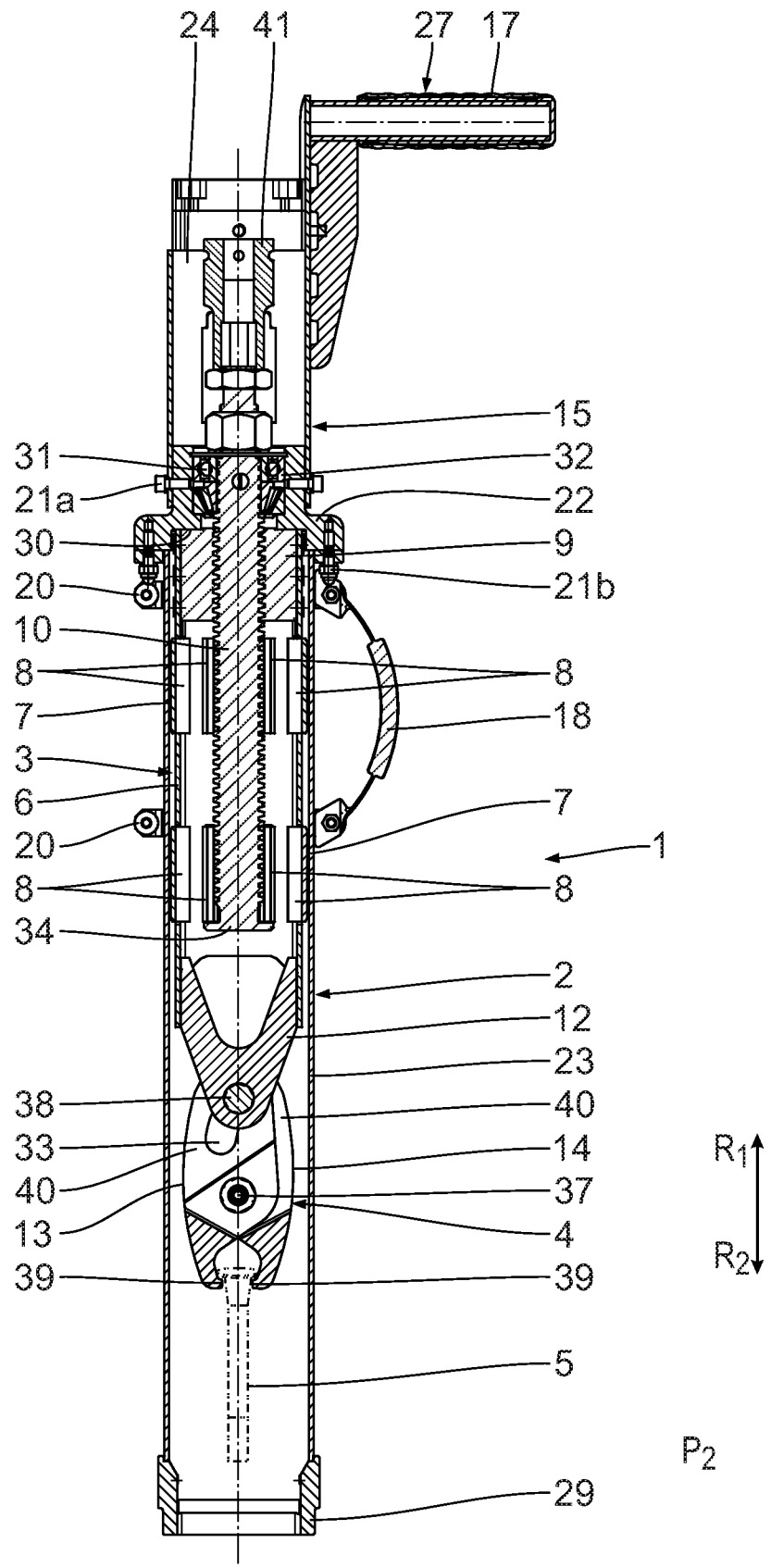
FIG. 2 is a longitudinal-sectional view of the spike puller taken along a section line II-II of FIG. 1, in the direction of the arrows, the section showing a linear displacement unit and a claw unit in an end position.
Figure 3:
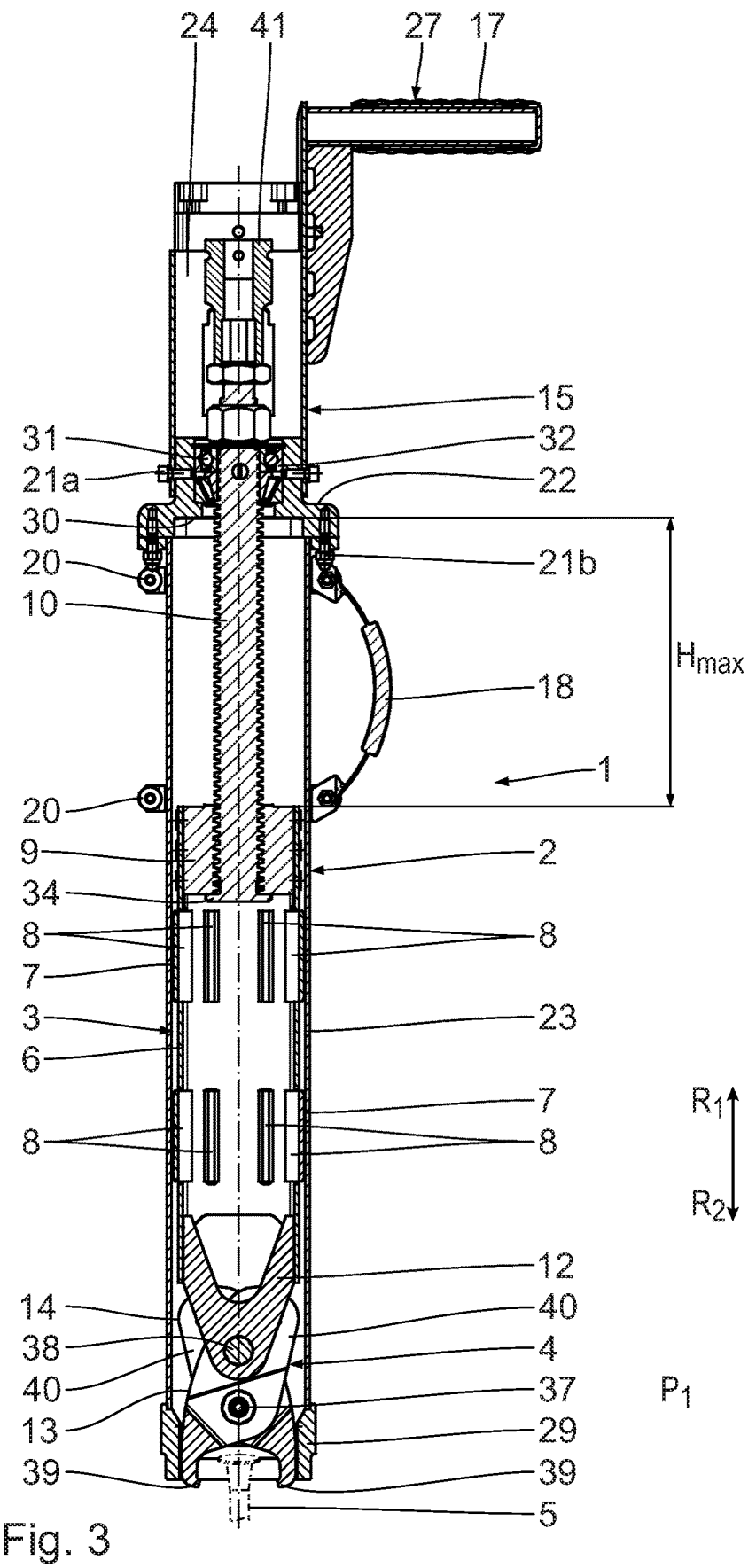
FIG. 3 is a longitudinal-sectional view of the spike puller similar to the view according to FIG. 2, the section showing the linear displacement unit and the claw unit in an engagement position.

The spike puller 1 includes a linear displacement unit 3 and a claw unit 4. The linear displacement unit 3 serves to displace the claw unit 4 in a displacement direction $R_1$ and in an opposite counter-displacement direction $R_2$. The linear displacement unit 3 and the claw unit 4 can be seen in particular in FIGS. 2 and 3. FIG. 2 shows the linear displacement unit 3 in an end position $P_2$, while the linear displacement unit 3 in FIG. 3 is shown in an engagement position $P_1$. The engagement position $P_1$ and the end position $P_2$ define a maximum stroke height $H_{max}$.

The linear displacement unit 3 includes a threaded spindle 10, a bearing 31, a mounting flange 9 and a hollow tube 6. The threaded spindle 10 is disposed and mounted in the upper housing portion 22 by the bearing 31, the upper housing portion 22 forming a bearing housing 32 in which the bearing 31 is disposed. The threaded spindle 10 extends through the bearing 31, and thus through the bearing housing 32, into the receiving space 24. A force transmission element 41 is disposed at one end of the threaded spindle 10 which extends into the receiving space 24. When the cordless screwdriver is inserted into the receiving space 24, it can be operatively connected to the force transmission element 41. As a result, the threaded spindle 10 can be driven in rotation when the cordless screwdriver is actuated.

The mounting flange 9 is disposed inside the hollow tube 6. The mounting flange 9 is constructed as a spindle nut with a square cross-section and has an internal thread which engages in the external thread of the threaded spindle 10. In order to prevent the mounting flange 9 from unscrewing from the threaded spindle 10, the latter has a stop element 34 at a lower end opposing the upper end.

The hollow tube 6 also has a square cross-section and is disposed at a circumferential outer side of the mounting flange 9 through fastening elements 21d. Since the fastening elements 21d are disposed vertically to the displacement direction $R_1$ and thus also vertically to a force flow resulting from the pulling of the railroad spike 5, they are loaded in shear in the illustrated embodiment.

The cross-section of the hollow tube 6 is configured in such a way that it is not rotatable within the lower housing portion 23 relative thereto. In other words, the hollow tube 6 has a maximum cross-section which is greater than or equal to a minimum cross-section of the lower housing portion 23. As a result, the mounting flange 9 and the hollow tube 6 are displaceable in a guided manner within the lower housing portion 23 in the displacement direction $R_1$ when the threaded spindle 10 is rotatably driven.

The hollow tube 6 has a plurality of guiding elements 8, which are attached to the hollow tube 6 by using a tongue-and-groove connection. For this purpose, the hollow tube 6 has grooves into which the tongues of the individual guiding elements 8 can be reversibly inserted.

The claw unit 4 serves for engaging a railroad spike 5 and is disposed at the hollow tube 6 through a claw fastening element 12. The claw fastening element 12 has a width $B_{GB}$ which is smaller than a width $B_H$ of the hollow tube 6. In the illustrated embodiment, the claw fastening element 12 is V-Shaped and welded to an inner surface of the hollow tube 6. The claw unit 4 has a first gripper 13 and a second gripper 14, the grippers being rotatably connected to each other through a rotary pin 37.

Each of the two grippers or claws 13 and 14 has an engaging portion 39. The respective engaging portions 39 are the portions of the claws 13 and 14 at which the latter engage the railroad spike 5.

Each of the two claws 13 and 14 also has a swivel portion 40. The respective swivel portions 40 are the portions of the claws 13 and 14 at which they are disposed at the claw fastening element 12 through a swivel pin 38. For fastening the claws 13 and 14, the claw fastening element 12 has a receiving bore 36 into which the pivot pin 38 can be reversibly inserted or plugged. The respective swivel portions 40 each have a curved swivel groove 33 in which the swivel pin 38 is guided in a pivotable manner. Through the use of the curved swivel grooves 33, the claws 13 and 14 are mounted on the swivel pin 38 so as to be pivotable relative to one another, as a result of which, when the swivel pin 38 is displaced within the curved swivel grooves 33, the two claws 13 and 14 can be rotated about the rotary pin 37.

The claw unit 4 can be displaced between the engagement position $P_1$ and the end position $P_2$ by linear displacement of the linear displacement unit 3 in the displacement direction $R_1$. The engagement position $P_1$ is the position in which the mounting flange 9 abuts the stopper 34 in a lowermost position and the claw unit 4 engages the railroad spike 5. The engagement position can be seen in FIG. 3. The end position $P_2$ is the position in which the mounting flange 9 abuts a stop 30 of the upper housing portion 22 in an uppermost position. The end position can be seen in FIG. 2.

Figure 4:
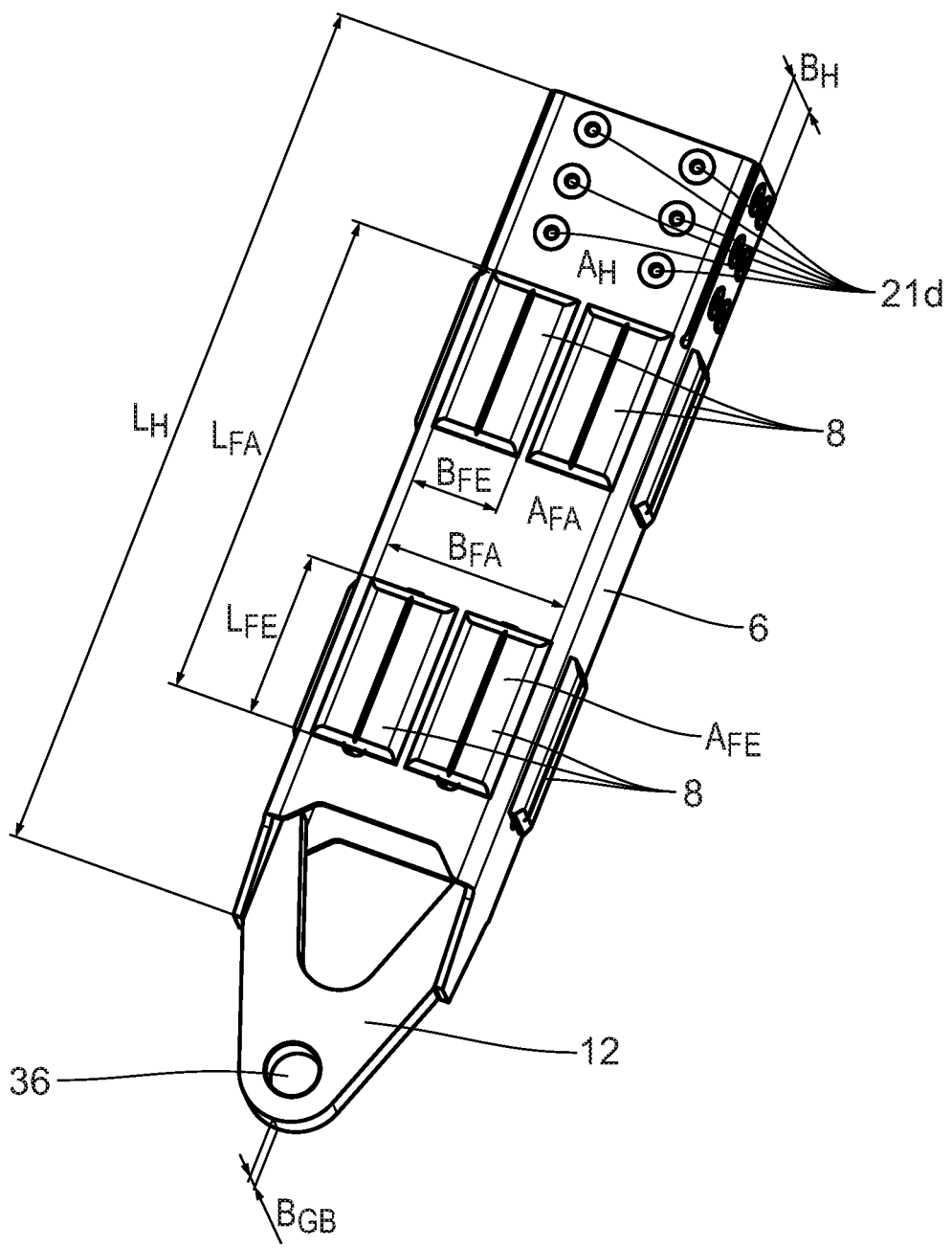
FIG. 4 is a perspective view of a hollow tube and a claw fastening element according to the first embodiment.

FIG. 4 shows the hollow tube 6 as well as guiding elements 8 disposed thereat and the claw fastening element 12. The guiding elements 8 serve to guide the hollow tube 6 within the lower housing portion 23. The hollow tube 6 has a length $L_H$ in the displacement direction $R_1$. The hollow tube 6 forms a guiding portion 7. The guiding portion 7 is the maximum distance between two guided points at which the hollow tube 6, and thus the linear displacement unit 3, is guided within the lower housing portion 23. The guiding portion 7 has a length $L_{FA}$ in the displacement direction $R_1$. For example, for a length ratio $L_{FA}/L_H$, $0.2 \leq L_{FA}/L_H \leq 1.0$, in particular $0.3 \leq L_{FA}/L_H \leq 0.9$, in particular $0.4 \leq L_{FA}/L_H \leq 0.8$. In addition, the guiding portion 7 has an area $A_{FA}$ and the hollow tube 6 has an area $A_H$, where an area ratio $A_{FA}/A_H$ is for example: $0.2 \leq A_{FA}/A_H \leq 1.0$, in particular $0.3 \leq A_{FA}/A_H \leq 0.9$, in particular $0.4 \leq A_{FA}/A_H \leq 0.8$. The area $A_H$ is defined by the length $L_H$ and the width $B_H$ of the hollow tube 6. The area $A_{FA}$ is defined by the length $L_{FA}$ and a width $B_{FA}$ of the guiding portion 7.

Each individual guiding element 8 has a length $L_{FE}$ and a width $B_{FE}$, through which an area $A_{FE}$ is defined for each guiding element 8. For a length ratio $L_{FE}/L_{FA}$, for example: $0.02 \leq L_{FE}/L_{FA} \leq 1.0$, in particular $0.1 \leq L_{FE}/L_{FA} \leq 0.9$, in particular $0.2 \leq L_{FE}/L_{FA} \leq 0.8$. For an area ratio $A_{FE}/A_{FA}$, for example: $0.02 \leq A_{FE}/A_{FA} \leq 1.0$, in particular $0.1 \leq A_{FE}/A_{FA} \leq 0.9$, in particular $0.2 \leq A_{FE}/A_{FA} \leq 0.8$. In this case, the area $A_{FE}$ is the guiding surface on which the hollow tube 6 is guided.

Figure 5:
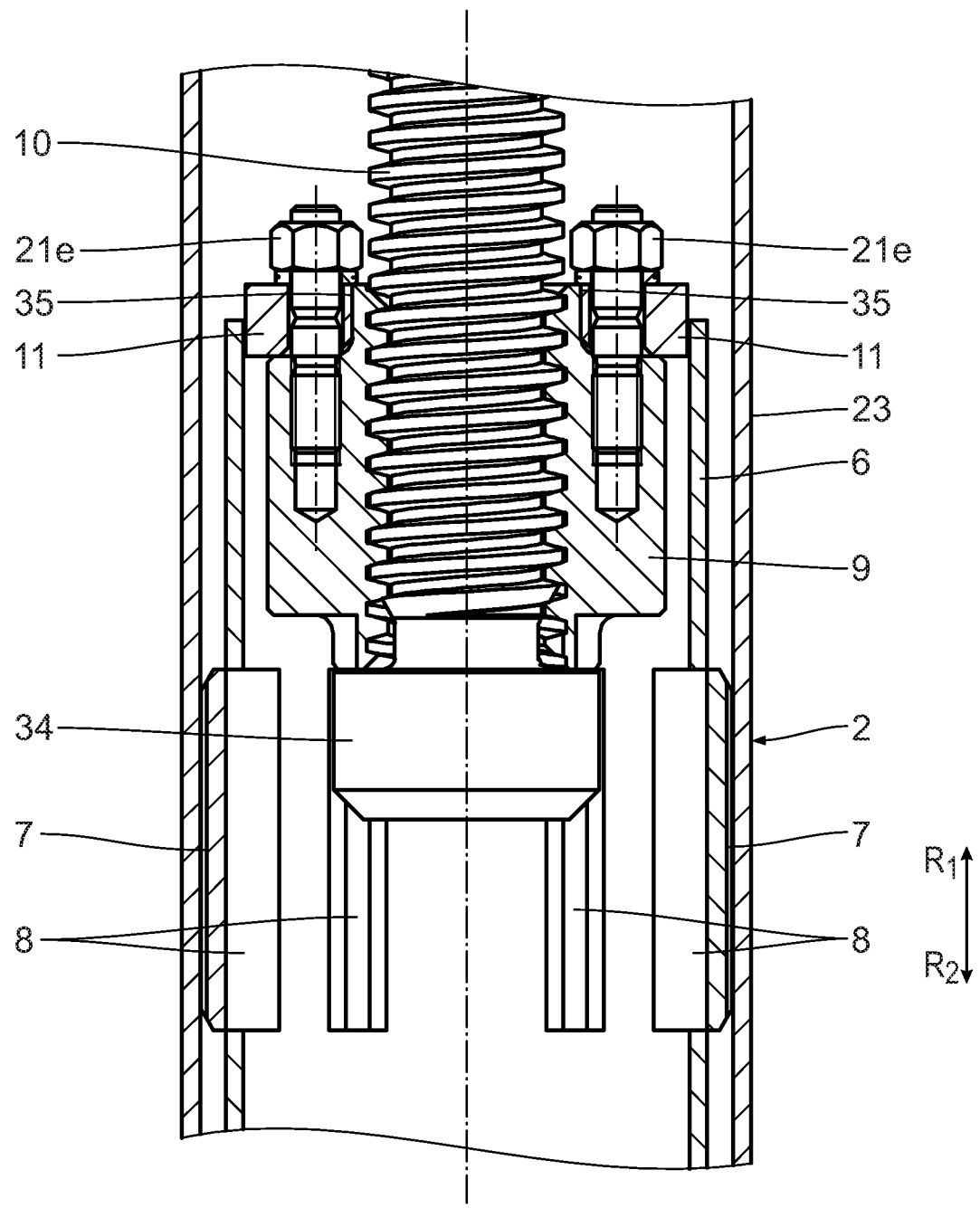
FIG. 5 is an enlarged, fragmentary, sectional view of a spike puller according to a second embodiment.

With reference to FIG. 5, a second embodiment of the spike puller 1 is described. Constructively identical components have the same reference numeral as in the previous FIGS. 1 to 4. In the second embodiment, the hollow tube 6 has an annular undercut 11 which forms a stop and abuts against a bearing surface 35 of the mounting flange 9. In the illustrated embodiment, the mounting flange 9 is disposed completely inside the hollow tube 6. The undercut 11 is reversibly fastened to the mounting flange 9 by using fastening elements 21e. In the illustrated embodiment, the fastening elements 21e are disposed in the direction of the force flow. Due to the undercut 11, the fastening elements 21e are in particular no longer loaded in tension and/or in shear. With regard to the further structure, reference is made to the preceding embodiment.

The method for pulling a railroad spike 5 from a track is as follows:

The spike puller 1 is positioned by the user above the railroad spike 5 to be pulled. The claw unit 4 is in the lower engaging position, with the claws 13 and 14 in the open position and gripping around the railroad spike 5. By actuating the drive unit 16 or the cordless screwdriver, the threaded spindle 10 is rotationally driven, whereby the mounting flange 9, the hollow tube 6 and the claw unit 4 are displaced upwards in the displacement direction $R_1$ within the housing 2. Due to the displacement, the swivel pin 38 disposed on the claw fastening element 12 causes the claws 13 and 14 to rotate about the rotary pin 37 as a result of the curved swivel grooves 33. The rotation results in a closing movement of the claws 13 and 14, causing the engaging portions 39 to engage the railroad spike 5. Subsequently, the claw unit 4 is displaced in the displacement direction $R_1$ by using the linear displacement unit 3 and by guiding the hollow tube 6 inside the housing 2 to the end position as far as the stop 30, whereby the railroad spike 5 is pulled out of the track.

For the transfer to the engagement position, the linear displacement unit 3 or the hollow tube 6 is displaced in the counter-displacement direction $R_2$. The claws 13 and 14 are spread again, for example, by a preloaded spring element. After removing the pulled railroad spike 5 from the claw unit 4, the spike puller 1 is ready to pull a railroad spike 5 again.

The invention claimed is:

1. A spike puller for pulling a railroad spike of a track, the spike puller comprising:
    a housing;
    a linear displacement unit mounted at said housing, said linear displacement unit including a hollow tube guided in said housing, and said linear displacement unit including a mounting flange and a threaded spindle, said mounting flange being disposed between said threaded spindle and said hollow tube, and said mounting flange being disposed completely within said hollow tube;
    a claw unit for engaging a railroad spike, said claw unit being displaceable by said linear displacement unit in a linear manner relative to said housing in a displacement direction; and
    an electric drive unit for electrically operating said linear displacement unit.

2. The spike puller according to claim 1, wherein said hollow tube of said linear displacement unit is exactly one hollow tube.

3. The spike puller according to claim 1, which further comprises a guiding portion having a length $L_{FA}$, said hollow tube having a length $L_H$, and said lengths having a length ratio of: $0.2 \leq L_{FA}/L_H \leq 1.0$.

4. The spike puller according to claim 1, which further comprises a guiding portion having an area $A_{FA}$, said hollow tube having an area $A_H$, and said areas having an area ratio of: $0.2 \leq A_{FA}/A_H \leq 1.0$.

5. The spike puller according to claim 1, which further comprises at least one guiding element disposed between said housing and said hollow tube.

6. The spike puller according to claim 5, which further comprises a guiding portion having a length $L_{FA}$, said guiding element having a length $L_{FE}$, and said lengths having a length ratio of: $0.02 \leq L_{FE}/L_{FA} \leq 1.0$.

7. The spike puller according to claim 5, which further comprises a guiding portion having an area $A_{FA}$, said guiding element having an area $A_{FE}$, and said areas having an area ratio of: $0.02 \leq A_{FE}/A_{FA} \leq 1.0$.

8. The spike puller according to claim 1, wherein said linear displacement unit includes a mounting flange disposed at said hollow tube.

9. The spike puller according to claim 8, wherein said hollow tube has an undercut encompassing said mounting flange in the displacement direction.

10. The spike puller according to claim 1, wherein said claw unit has two claws for engaging a railroad spike, said two claws being configured to swivel relative to one another.

11. The spike puller according to claim 1, which further comprises a drive unit, and a receiving retainer for receiving said drive unit.

12. The spike puller according to claim 11, wherein said receiving retainer has a handhold for holding the spike puller.

13. The spike puller according to claim 1, wherein:
    said housing has an upper housing portion and a lower housing portion;
    said linear displacement unit includes a threaded spindle;
    at least one bearing is disposed at said upper housing portion for bearing said threaded spindle; and
    said hollow tube is guided in said lower housing portion.

14. A spike puller for pulling a railroad spike of a track, the spike puller comprising:
    a housing;
    a linear displacement unit mounted at said housing, said linear displacement unit including exactly one hollow tube guided in said housing, as seen in a direction transverse to an axis of rotation of said linear displacement unit;
    a claw unit for engaging a railroad spike, said claw unit being displaceable by said linear displacement unit in a linear manner relative to said housing in a displacement direction;
    an electric drive unit for electrically operating said linear displacement unit; and
    a claw fastening element fastening said claw unit at said hollow tube.

15. The spike puller according to claim 14, wherein said claw fastening element is fastened to an inner surface of said hollow tube.

16. A spike puller for pulling a railroad spike of a track, the spike puller comprising:
    a housing;
    a linear displacement unit mounted at said housing, said linear displacement unit including a hollow tube guided in said housing, said linear displacement unit including a mounting flange and a threaded spindle, and said mounting flange being disposed between said threaded spindle and said hollow tube;
    a claw unit for engaging a railroad spike, said claw unit being displaceable by said linear displacement unit in a linear manner relative to said housing in a displacement direction;

said hollow tube having an undercut encompassing said mounting flange in said displacement direction; and an electric drive unit for electrically operating said linear displacement unit.

17. The spike puller according to claim 16, wherein said threaded spindle is configured to be driven in rotation upon actuating said electric drive unit.

18. The spike puller according to claim 16, wherein said threaded spindle has an external thread, and said mounting flange has an internal thread operatively connected to said external thread.

19. The spike puller according to claim 16, wherein a rotation of said threaded spindle causes a linear movement of said mounting flange.

20. The spike puller according to claim 16, wherein said threaded spindle has a force transmission element configured for attachment of said electric drive unit.

21. A method for pulling a railroad spike of a track, the method comprising:

providing a spike puller for pulling a railroad spike of a track, the spike puller including:

a housing, a linear displacement unit mounted at the housing, the linear displacement unit including a hollow tube guided in the housing, the linear displacement unit including a mounting flange and a threaded spindle, the mounting flange being disposed between the threaded spindle and the hollow tube, and the mounting flange being disposed completely within the hollow tube, a claw unit for engaging a railroad spike, the claw unit being displaceable by the linear displacement unit in a linear manner relative to the housing in a displacement direction, and an electric drive unit for electrically operating the linear displacement unit;

positioning the spike puller above the railroad spike and engaging the claw unit around the railroad spike; and driving the linear displacement unit by using the electric drive unit, causing the hollow tube to be linearly displaced and guided within the housing and the railroad spike to be pulled out of the track.

* * * * *